C. Rider,
Water Wheel,
N° 21,928. Patented Oct. 26, 1858.

UNITED STATES PATENT OFFICE.

CALEB RIDER, OF PLYMOUTH, ASSIGNOR TO GEORGE T. McLAUTHLIN, OF BOSTON, MASSACHUSETTS.

IMPROVEMENT IN WATER-MOTORS.

Specification forming part of Letters Patent No. 21,928, dated October 26, 1858.

*To all whom it may concern:*

Be it known that I, CALEB RIDER, of Plymouth, in the county of Plymouth and State of Massachusetts, have invented certain Improvements in Water-Motors, of which the following is a full, clear, and exact description, reference being had to the accompanying drawings, making part of this specification, in which—

Figure 1:
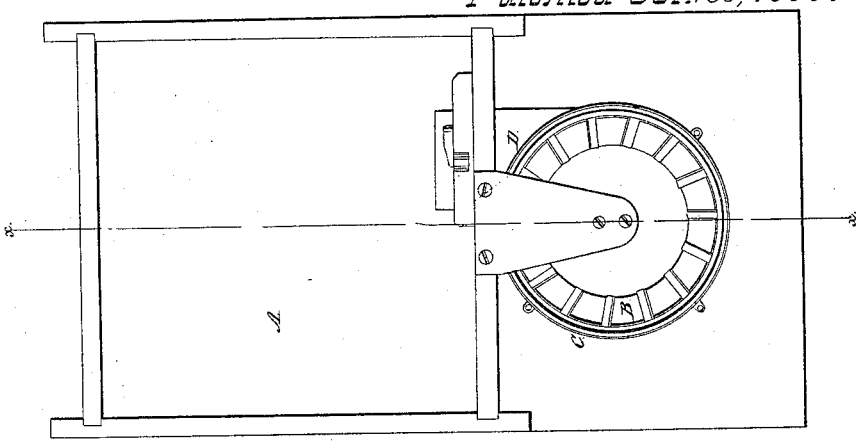
Figure 3:
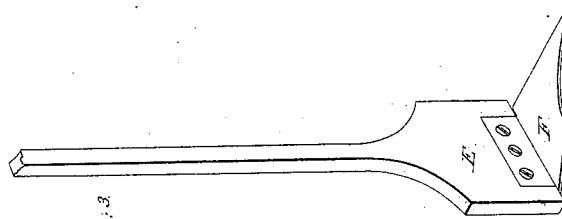
Figure 4:
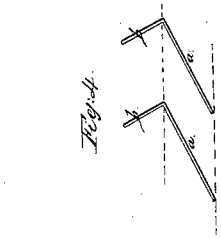
Figure 2:
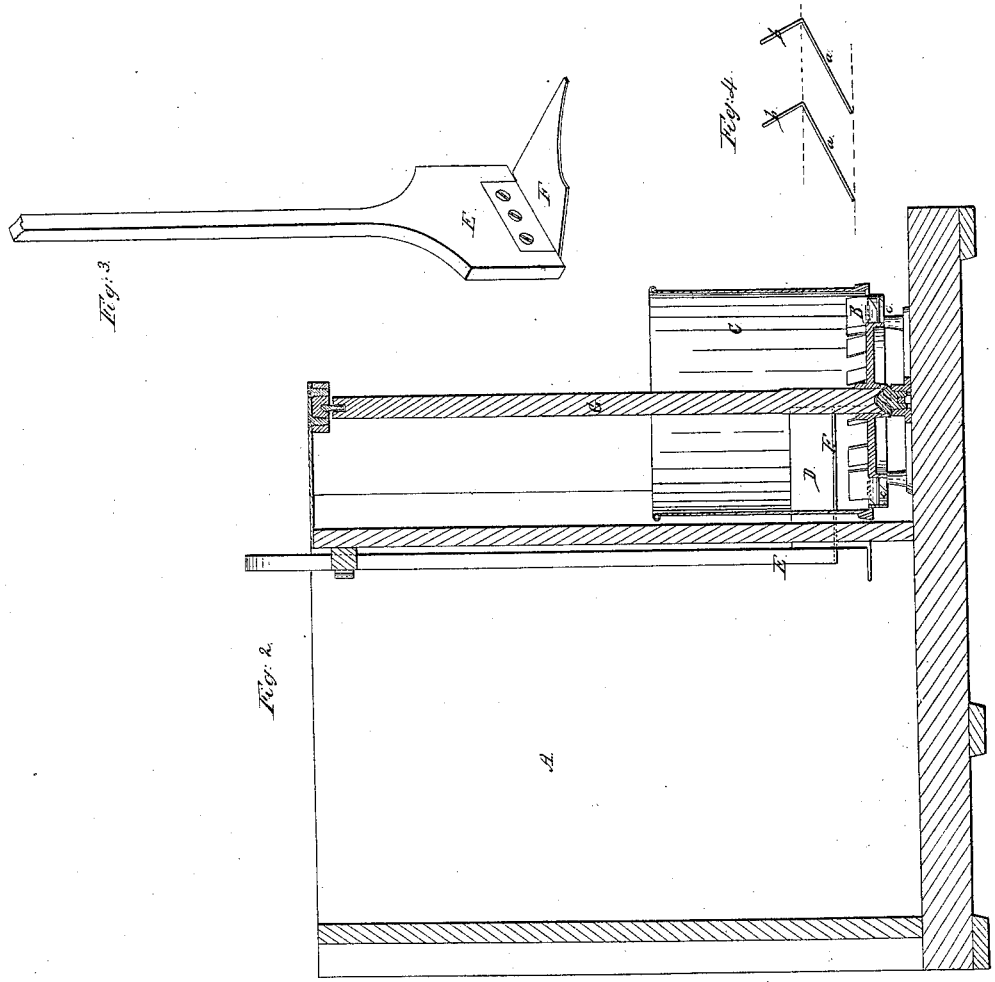

Figure 1 is a plan; Fig. 2, a vertical section on the line $x\ x$ of Fig. 1. Fig. 3, a view of the gate and shoe detached; Fig. 4, a detail to be referred to hereinafter.

By long-continued experiments with horizontal water-wheels I have practically established the following principles, and upon these principles I have based the construction of my improved water-motor: first, that the appurtenances and their precise arrangements are as essential in producing a perfect water-motor as the water-wheel itself, the merits of neither being known or fixed, except when considered in their relation to and connection with each other; second, that a wheel combining distinctively the use of both the percussive and reactive force of the water possesses many advantages not found in wheels which act by either force independent of the other or by the two disproportionately or not distinctively developed; third, that the perfection of such a wheel requires the existence of a certain relation between the inlet or gate apertures and the outlet or wheel apertures, the best result obtaining when the two are equal in aggregate measurement; fourth, that whereas in practice water-wheels are frequently required to work at less than their full power, owing either to varying head, varying supply of water, or varying amount of work required, some one or all of these being common to water privileges generally, it is necessary to provide for the most favorable working of a water-wheel under portions of a full gate—that is, under circumstances when it is not practicable to maintain the equality of inlet and outlet apertures, above referred to, and that this is best done by a chute having a supplementary movable top which shall govern and guide the inlet-current through the chute and into the tub in one unbroken jet, whether the gate be opened more or less; fifth, that under such an application of the water the floats and buckets should be so constructed and arranged and so connected to each other and the wheel of which they form a part that the action of the water on the float, which is designed to receive the percussive effect of the water, shall neither detract from nor interfere in any manner with the action of the water on the bucket which is designed to receive the pressure or reactionary power of the water, and vice versa, which desirable result I have found to obtain only when the buckets lie on an angle of twenty-seven degrees, or thereabout, to the plane of rotation and the floats at an angle of ninety degrees, or thereabout, to the face of said buckets; sixth, that the effect of a jet of water is not so fully secured by direct and immediate action upon the floats and buckets of a wheel of this class as when its force is diffused through a body of water which is not closely confined, but revolving over or against and with the wheel, through which medium also its power is more equally applied to all of the floats and buckets of the wheel at one and the same time, and that the effect of a jet of water is less impaired when tangentially directed into a perfect circle or cylinder than when directed into a scroll (which is also more expensive) or any form of cistern departing from a true circle, advantage of which I have taken by placing my wheel in the center of a round cylinder or bottomless tub of sufficient height and diameter to allow of the free rotation of the water which is being impelled by the inlet jet or jets over and around the floats and over the buckets of the wheel and directing the water into said cylinder through one or more chutes placed tangential thereto.

In carrying out my invention I have united all the above principles by combining them in one water-motor, which motor consists of the combination of a wheel, a tub or cylinder, a chute, a gate, and a gate-shoe or movable chute-top, the construction and operation of which parts I will now proceed to describe.

In the accompanying drawings, A is the flume; B, the water-wheel secured to its shaft G and running upon a step H; C, the tub to which the water is admitted through the chute D, which is commanded by the gate E.

To the bottom of the gate is attached the shoe or supplementary chute-top F, which serves to guide the water in an unbroken current into the tub when the wheel is worked at less than full gait. This chute is so set, as seen in Fig. 1, that the water shall enter the tub on a tangent thereto.

In Fig. 4 are seen two of the buckets, the inclines $a$ making an angle of about twenty-seven degrees at the center of the bucket with a horizontal plane, and the float $b$ an angle of about ninety degrees with the inclines. These I have found to respectively require the same velocity of wheel to give the best results from the combination of both the percussive and reactionary forces of the water in the tub, and not in any other manner to conflict with each other.

The aggregate of all the apertures $c$ of the wheel are just equal to the gate-aperture D, the best results being obtained, as before stated, when this equality of gate and wheel aperture exists, or, in other words, when a full gate is used. The water in the tub rises when this equality of inlet and outlet aperture exists to an average height of one-half of that in the flume, and the revolution of the water in the tub causes it to rise much higher at the circumference than in the center, thus throwing the weight and body of water over the buckets and floats where its work is done and relieving the central part of superincumbent weight, yielding an increased net effect from the water used.

Among the advantages possessed by the water-motor consisting of the above-described construction and arrangement of water-wheel, tub, chute, gate, and gate-shoe or movable chute-top may be enumerated the following: It operates with great economy in its use of water, and affords under ordinary falls as much power as the breast and overshot wheels, while it gives a better percentage of the power of the water used when working at portions of a full gate than any other iron wheel. Unlike most others of its class, this wheel uses less water when in light labor and running beyond its best working velocity than when reduced in speed. It therefore becomes to a certain extent self-regulating, and is consequently more regular and steady in its motion under a varying load than other wheels. It is also less liable to clog than other wheels, the peculiar application of the water requiring larger apertures than most other horizontal wheels to pass the same amount of water. It is less liable to breakage or derangement, the water being applied in an open tub, which allows stones and blocks of wood of considerable size to revolve round in the tub with the wheel without material injury to either wheel or tub. It works well in backwater, a wheel six feet in diameter, with five hundred inches capacity of discharge, giving five to six horse-power; under seven feet backwater, with but two feet of clear head above it, and under these circumstances it is found to do an equal amount of work as with two feet of clear head without the backwater. Its step and upper bearing are not liable to side or partial wear, as the revolving body of water within the tub is acting upon all parts of the wheel at once.

Thus far I have described the buckets of my wheel as composed of inclines $a$ and floats $b$ placed at right angles to each other.

In lieu of the rectangular floats and inclines curved buckets may be employed, the general inclination of the different portions of which to each other and to the plane of the wheel shall correspond to that above described.

In lieu of a single chute two or more may be employed without altering the principle of my invention.

What I claim as my invention, and desire to secure by Letters Patent, is the union or combination of the following elements or features, viz:

1. Making the inlet-aperture of the tub and the outlet-apertures of the wheel of the same aggregate area.

2. Forming the buckets of two planes or curves, the lower one making an angle of twenty-seven degrees, or thereabout, with the plane of rotation of the wheel and ninety degrees with the float or upper portion of the bucket.

3. Making the tub circular and of sufficient height and diameter to allow free action of the water therein and causing the water to enter from the flume on a tangent thereto, whereby the inlet-current is relieved from immediate and direct contact against the floats and buckets of the wheel and caused to spend its force upon the water already accumulated in the tub, and through that upon all the floats and buckets of the wheel itself, the whole forming a water-motor arranged and operating substantially as herein described.

CALEB RIDER.

Witnesses:
SAM. COOPER,
P. E. TESCHEMACHER.